US007367056B1

(12) United States Patent
Szor et al.

(10) Patent No.: US 7,367,056 B1
(45) Date of Patent: Apr. 29, 2008

(54) COUNTERING MALICIOUS CODE INFECTIONS TO COMPUTER FILES THAT HAVE BEEN INFECTED MORE THAN ONCE

(75) Inventors: Peter Szor, Santa Monica, CA (US); Carey Nachenberg, Northridge, CA (US)

(73) Assignee: Symantec Corporation, Cupertino, CA (US)

(*) Notice: Subject to any disclaimer, the term of this patent is extended or adjusted under 35 U.S.C. 154(b) by 751 days.

(21) Appl. No.: 10/162,732

(22) Filed: Jun. 4, 2002

(51) Int. Cl.
*G06F 11/00* (2006.01)
*H04L 9/00* (2006.01)
(52) U.S. Cl. .................. 726/24; 726/22; 726/26
(58) Field of Classification Search ............ 726/24, 726/22; 713/165
See application file for complete search history.

(56) References Cited

U.S. PATENT DOCUMENTS

| | | | |
|---|---|---|---|
| 5,398,196 A | | 3/1995 | Chambers |
| 5,440,723 A | * | 8/1995 | Arnold et al. ................. 714/2 |
| 5,442,699 A | * | 8/1995 | Arnold et al. ............... 713/188 |
| 5,452,442 A | * | 9/1995 | Kephart ........................ 714/38 |
| 5,473,769 A | * | 12/1995 | Cozza .......................... 714/39 |
| 5,485,575 A | * | 1/1996 | Chess et al. .................. 714/38 |
| 5,572,590 A | | 11/1996 | Chess |
| 5,675,710 A | | 10/1997 | Lewis |
| 5,696,822 A | | 12/1997 | Nachenberg |
| 5,715,174 A | | 2/1998 | Cotichini et al. |
| 5,715,464 A | | 2/1998 | Crump et al. |
| 5,758,359 A | | 5/1998 | Saxon |
| 5,812,763 A | | 9/1998 | Teng |
| 5,826,249 A | | 10/1998 | Skeirik |
| 5,832,208 A | | 11/1998 | Chen et al. |
| 5,854,916 A | | 12/1998 | Nachenberg |
| 5,883,906 A | * | 3/1999 | Turnquist et al. ........... 714/738 |
| 5,889,943 A | | 3/1999 | Ji et al. |
| 5,949,973 A | | 9/1999 | Yarom |

(Continued)

FOREIGN PATENT DOCUMENTS

DE       100 21 686 A1    11/2001

(Continued)

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

(Continued)

*Primary Examiner*—Ayaz Sheikh
*Assistant Examiner*—Trang Doan
(74) *Attorney, Agent, or Firm*—Fenwick & West LLP

(57) ABSTRACT

Methods, apparati, and computer-readable media for countering malicious code infections to computer files (20). A preferred embodiment comprises selecting (40) an invariant section of each file (20), wherein said invariant section is invariant to malicious code infections and to repair thereof; for each of a set of known malicious code files, using an algorithm to generate (41) a template corresponding to the invariant section; using said algorithm to define a target (29), corresponding to said invariant section, within a test file (20); comparing (46) the target (29) with the templates; and declaring (48) the presence of malicious code in the test file (20) when the target (29) matches a template.

25 Claims, 5 Drawing Sheets

U.S. PATENT DOCUMENTS

| | | | |
|---|---|---|---|
| 5,951,698 A | 9/1999 | Chen et al. | |
| 5,956,481 A | 9/1999 | Walsh et al. | |
| 5,960,170 A | 9/1999 | Chen et al. | |
| 5,974,549 A | 10/1999 | Golan | |
| 5,978,917 A | 11/1999 | Chi | |
| 5,987,610 A | 11/1999 | Franczek et al. | |
| 6,021,510 A * | 2/2000 | Nachenberg | 714/38 |
| 6,023,723 A | 2/2000 | McCormick et al. | |
| 6,052,709 A | 4/2000 | Paul | |
| 6,070,244 A | 5/2000 | Orchier et al. | |
| 6,072,830 A | 6/2000 | Proctor et al. | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A * | 7/2000 | Waldin et al. | 714/38 |
| 6,104,872 A | 8/2000 | Kubota et al. | |
| 6,108,799 A | 8/2000 | Boulay et al. | |
| 6,141,698 A * | 10/2000 | Krishnan et al. | 719/331 |
| 6,161,130 A | 12/2000 | Horvitz et al. | |
| 6,167,434 A | 12/2000 | Pang | |
| 6,192,379 B1 | 2/2001 | Bekenn | |
| 6,199,181 B1 | 3/2001 | Rechef et al. | |
| 6,253,169 B1 | 6/2001 | Apte et al. | |
| 6,275,938 B1 | 8/2001 | Bond et al. | |
| 6,298,351 B1 | 10/2001 | Castelli et al. | |
| 6,334,213 B1 * | 12/2001 | Li | 717/170 |
| 6,338,141 B1 | 1/2002 | Wells | |
| 6,347,310 B1 | 2/2002 | Passera | |
| 6,357,008 B1 | 3/2002 | Nachenberg | |
| 6,367,012 B1 * | 4/2002 | Atkinson et al. | 713/176 |
| 6,370,526 B1 | 4/2002 | Agrawal et al. | |
| 6,370,648 B1 | 4/2002 | Diep | |
| 6,397,200 B1 | 5/2002 | Lynch et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,535,891 B1 | 3/2003 | Fisher et al. | |
| 6,552,814 B2 | 4/2003 | Okimoto et al. | |
| 6,577,920 B1 * | 6/2003 | Hypponen et al. | 700/200 |
| 6,611,925 B1 | 8/2003 | Spear | |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,763,462 B1 | 7/2004 | Marsh | |
| 6,813,712 B1 | 11/2004 | Luke | |
| 6,851,057 B1 | 2/2005 | Nachenberg | |
| 6,910,134 B1 | 6/2005 | Maher et al. | |
| 2002/0004908 A1 | 1/2002 | Galea | |
| 2002/0035693 A1 | 3/2002 | Eyres et al. | |
| 2002/0035696 A1 | 3/2002 | Thacker | |
| 2002/0038308 A1 | 3/2002 | Cappi | |
| 2002/0046275 A1 | 4/2002 | Crosbie et al. | |
| 2002/0073046 A1 | 6/2002 | David | |
| 2002/0083175 A1 | 6/2002 | Afek et al. | |
| 2002/0087649 A1 | 7/2002 | Horvitz | |
| 2002/0091940 A1 | 7/2002 | Wellborn et al. | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2002/0178375 A1 | 11/2002 | Whittaker et al. | |
| 2002/0194488 A1 | 12/2002 | Cormack et al. | |
| 2002/0199186 A1 | 12/2002 | Ali et al. | |
| 2002/0199194 A1 | 12/2002 | Ali | |
| 2003/0023865 A1 * | 1/2003 | Cowie et al. | 713/200 |
| 2003/0033587 A1 | 2/2003 | Ferguson et al. | |
| 2003/0051026 A1 | 3/2003 | Carter et al. | |
| 2003/0065926 A1 | 4/2003 | Schultz et al. | |
| 2003/0115458 A1 | 6/2003 | Song | |
| 2003/0115479 A1 | 6/2003 | Edwards et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 * | 7/2003 | Radatti | 707/100 |
| 2003/0191966 A1 | 10/2003 | Gleichauf | |
| 2003/0204703 A1 * | 10/2003 | Rajagopal et al. | 711/216 |
| 2003/0212902 A1 | 11/2003 | van der Made | |
| 2003/0236995 A1 | 12/2003 | Fretwell, Jr. | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0039921 A1 | 2/2004 | Chuang | |
| 2004/0158730 A1 | 8/2004 | Sarkar | |
| 2004/0162808 A1 | 8/2004 | Margolus et al. | |
| 2004/0181687 A1 | 9/2004 | Nachenberg et al. | |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0177736 A1 | 8/2005 | De los Santos et al. | |
| 2005/0204150 A1 | 9/2005 | Peikari | |
| 2006/0064755 A1 | 3/2006 | Azadet et al. | |

FOREIGN PATENT DOCUMENTS

| | | |
|---|---|---|
| EP | 0636977 A2 | 2/1995 |
| EP | 1 280 039 A | 1/2003 |
| EP | 1408393 A2 | 4/2004 |
| GB | 2 364 142 A | 1/2002 |
| WO | WO 93/25024 A1 | 12/1993 |
| WO | WO 97/39399 A | 10/1997 |
| WO | WO 99/15966 A1 | 4/1999 |
| WO | WO 00/28420 A2 | 5/2000 |
| WO | WO 01/37095 A1 | 5/2001 |
| WO | WO 01/91403 A | 11/2001 |
| WO | WO 02/05072 A | 1/2002 |
| WO | WO 02/33525 A2 | 4/2002 |

OTHER PUBLICATIONS

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Burchell, Jonathan, "NetShield 1.5", Virus Bulletin, Aug. 1994, pp. 21-23, XP 000617453.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine_learning_and_ printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [retrieved May 1, 2003]. Retrieved from the Internet: <URL: http://pageexec.virualave.net/docs/randustack.txt>.

Randkstack web pages [online]. Virtualave.net [retrieved May 1, 2003]. Retrieved from the Internet: <URL: http://pageexec.virualave.net/docs/randkstack.txt>.

Randmap web pages [online]. Virtualave.net [retrieved May 1, 2003]. Retrieved from the Internet: <URL: http://pageexec.virualave.net/docs/randmmap.txt>.

Randexec web pages [online]. Virtualave.net [retrieved May 1, 2003]. Retrieved from the Internet: <URL: http://pageexec.virualave.net/docs/randexec.txt>.

VMA Mirroring web pages [online]. Virtualave.net [retrieved May 1, 2003]. Retrieved from the Internet: <URL: http://pageexec.virualave.net/docs/vmmirror.txt>.

Aho, Alfred V., et al. Compilers, Addison-Wesly Publishing Company, USA, revised edition 1988.

Periot, Frederic, "Defeating Polymorphism Through Code Optimization", Paper given at the Virus Bulletin conference, Sep. 26-27 Oct. 2003 pp. 142-159, Toronto, Canada, published by Virus Bulletin Ltd., The pentagon, Abington, Oxfordshire, England.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

* cited by examiner

US 7,367,056 B1

COUNTERING MALICIOUS CODE INFECTIONS TO COMPUTER FILES THAT HAVE BEEN INFECTED MORE THAN ONCE

TECHNICAL FIELD

This invention pertains to the field of detecting malicious code (such as a worm or Trojan horse) in computer files that have been secondarily infected by a parasitic computer infection (usually a virus). The invention also pertains to detection of files containing malicious code that have been secondarily infected by a parasitic infection, and subsequently have had the secondary infection removed by an anti-virus product.

BACKGROUND ART

Current software products that scan computer files for malicious code infections (viruses, worms, and Trojan horses) have a particularly difficult problem when the computer file has been infected by an unknown secondary infection (normally a viral infection). As used throughout this patent application, "secondary" means a second or higher order infection. For example, a piece of code containing a Trojan horse or a worm might be secondarily infected by a virus. Such a secondary infection changes the signature and make-up of the original Trojan or worm program, and quite often causes the antivirus software product to miss the infection.

Furthermore, even if the antivirus software product can detect the secondary viral infection, there may still be problems. If the antivirus software product detects and repairs the secondary infection, leaving the original Trojan/worm code, the repair often does not restore the Trojan/worm to its original form, and thus the signature of the Trojan/worm is different than the uninfected version of the Trojan/worm. Consequently, the repaired version of the Trojan/worm may also very well be missed by the antivirus software product.

The above-described problems are present whether or not the antivirus software product detects viruses with traditional fingerprints or with hashes of files (i.e., comparing the hash of a file against hashes of known malicious code). This is because hashes of the repaired or secondarily infected malicious code are likewise different from the hashes of the original uninfected malicious code, when the repaired or secondarily infected malicious code is different from the original uninfected malicious code.

The above-described problems are quite common, particularly in the Win32 environment (i.e., for computer files that operate under a 32 bit Windows operating system manufactured by Microsoft Corporation). Most prior art antivirus scanners use traditional virus signatures; or, alternatively, use full file CRC's (Cyclic Redundancy Checks) or CRC's based on the code section and/or headers of executable files. These methods fail to detect infections in many circumstances. The prior art has heretofore not been able to produce a technique that yields both a very low false positive rate as well as properly dealing with secondary infections (repaired or not). These deficiencies of the prior art are remedied by the present invention, which offers the further advantage of being able to detect closely related minor variants of the same malicious code.

DISCLOSURE OF INVENTION

Methods, apparatus, and computer-readable media for countering malicious code infections to computer files (20). A preferred embodiment comprises selecting (40) an invariant section of each file (20), wherein said invariant section is invariant to malicious code infections and to repair thereof; for each of a set of known malicious code files, using an algorithm to generate (41) a template corresponding to the invariant section; using said algorithm to define a target (29), corresponding to said invariant section, within a test file (20); comparing (46) the target (29) with the templates; and declaring (48) the presence of malicious code in the test file (20) when the target section (29) matches a template.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

As used throughout this patent application, "malicious code" means any computer program, module, or piece of code that enters a computer system without the authorized user's knowledge and/or without the authorized user's consent. The term "malicious code" includes viruses, Trojan horses, and worms. The malicious code may or may not have the ability to replicate itself.

Figure 1:
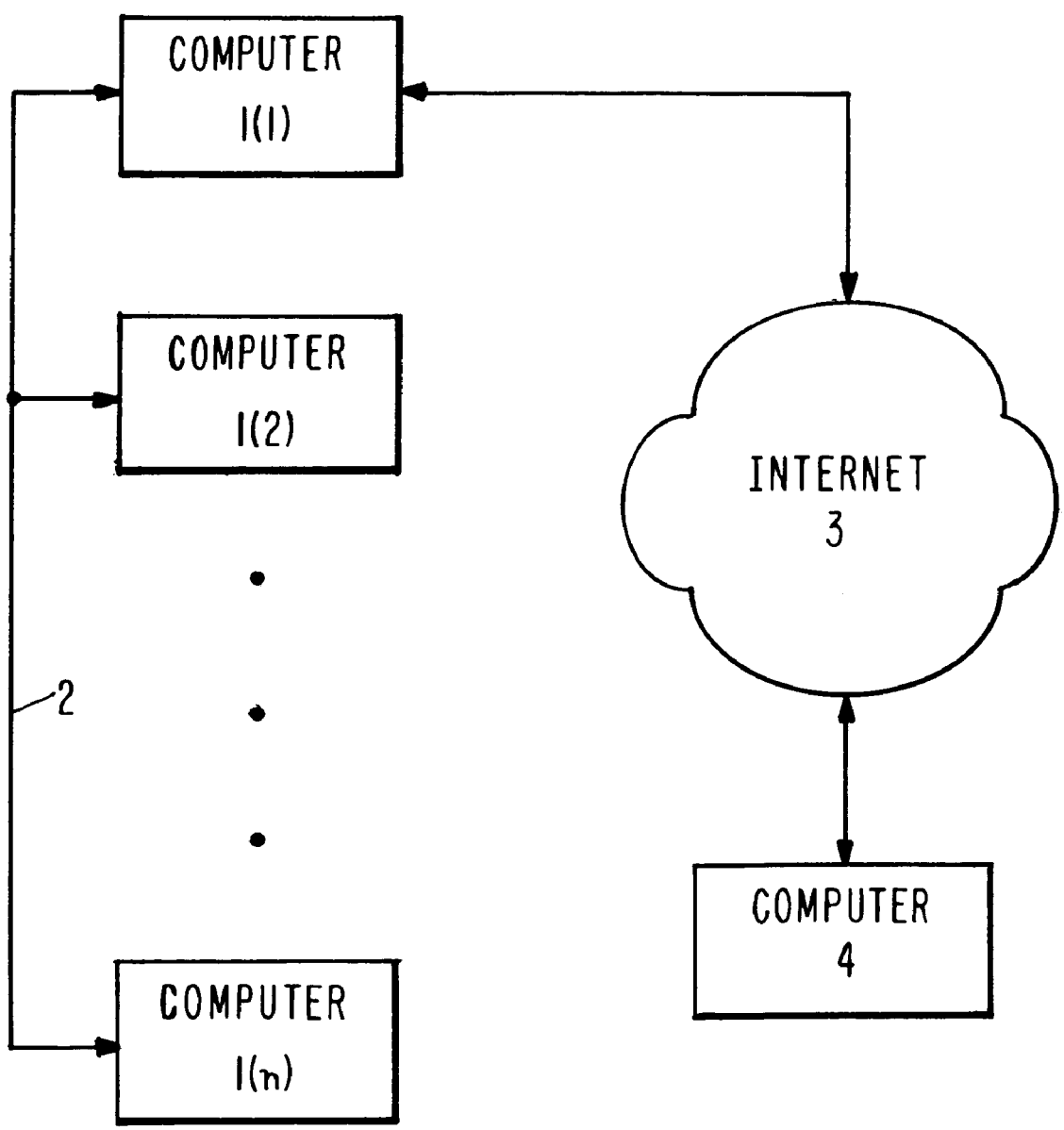
FIG. 1 is an illustration of a computer network in which the present invention has applicability.

FIG. 1 illustrates a networked environment in which the present invention has applicability. A plurality of computers 1 are interconnected in a closed proprietary network 2. FIG. 1 illustrates n interconnected computers, where n is an arbitrary positive integer. Computer 1(1) is also coupled via an open network such as the Internet 3 to another computer 4. A malicious code program of the "worm" variety has the capability to attack computer 1(1) with the ability to replicate itself and thus attack another computer 1 via network 2, or attack computer 4 via network 3.

Malicious code can also be spread in a non-networked environment, for example, by someone inserting an infected floppy disk or compact disk into computer 1. Such malicious code is often referred to as a "virus", and can secondarily infect a worm or Trojan horse program. A "Trojan horse" is a standalone program that doesn't replicate itself, but does something unanticipated when executed.

Figure 2:
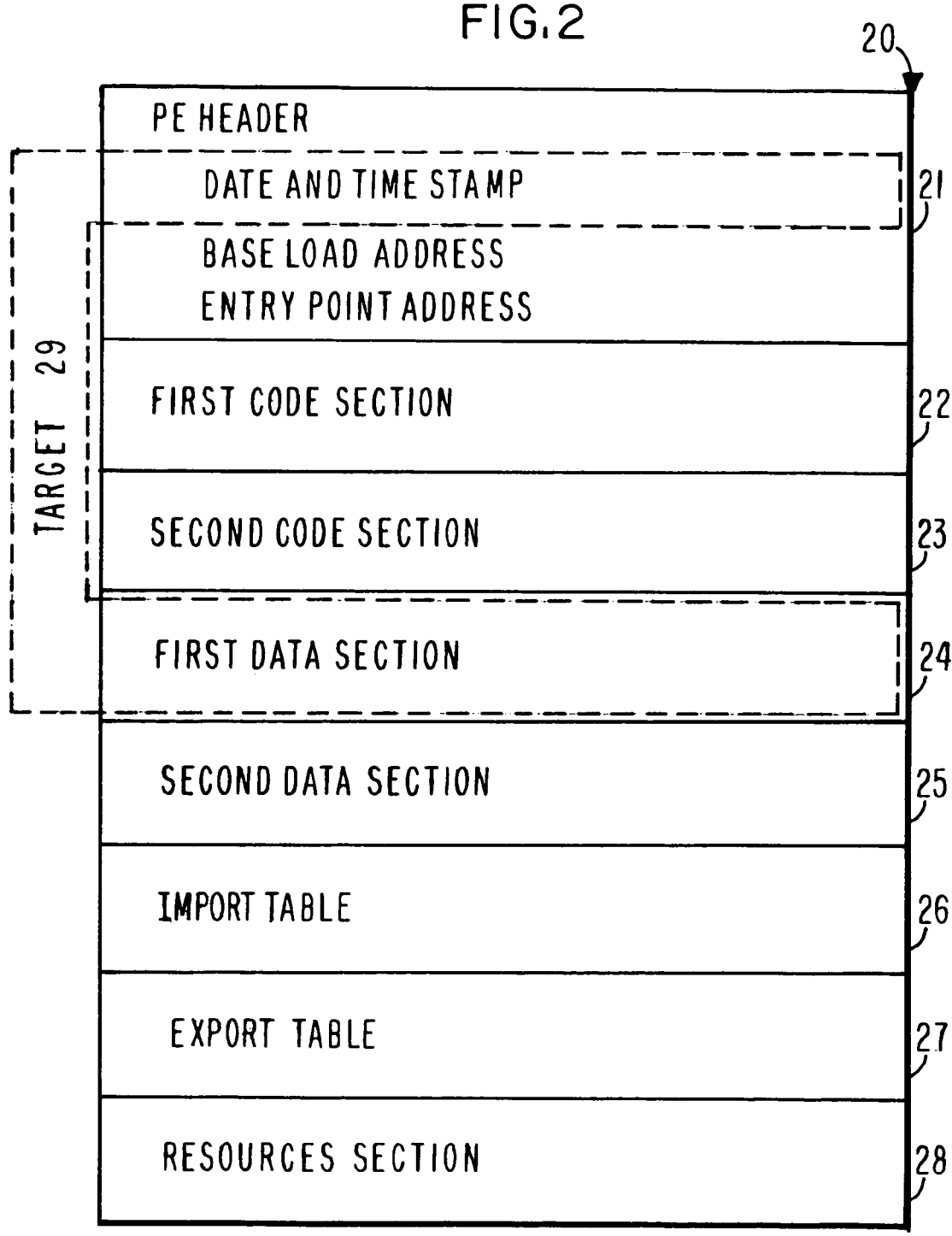
FIG. 2 is an illustration of a PE (Portable Executable) file format 20 for which the present invention has applicability.

FIG. 2 illustrates a file (module) 20 which the malicious code may infect. For purposes of illustration, file 20 is shown as being in the PE (Portable Executable) format, a standard format for files used in the Win32 API (Application Programming Interface). Win32 is used in 32 bit operating systems manufactured by Microsoft Corporation.

PE file 20 often includes a PE header 21, one or more code sections 22, 23, one or more data sections 24, 25, an import table 26, an export table 27, and a resources section 28 (a fix-up section used by the loader). PE header 21 may include a date and time stamp, a base load address where file 20 is inserted in the computer 1 memory, and an entry point address, i.e., an offset from the beginning of file 20 where file 20 begins executing.

Figure 3:
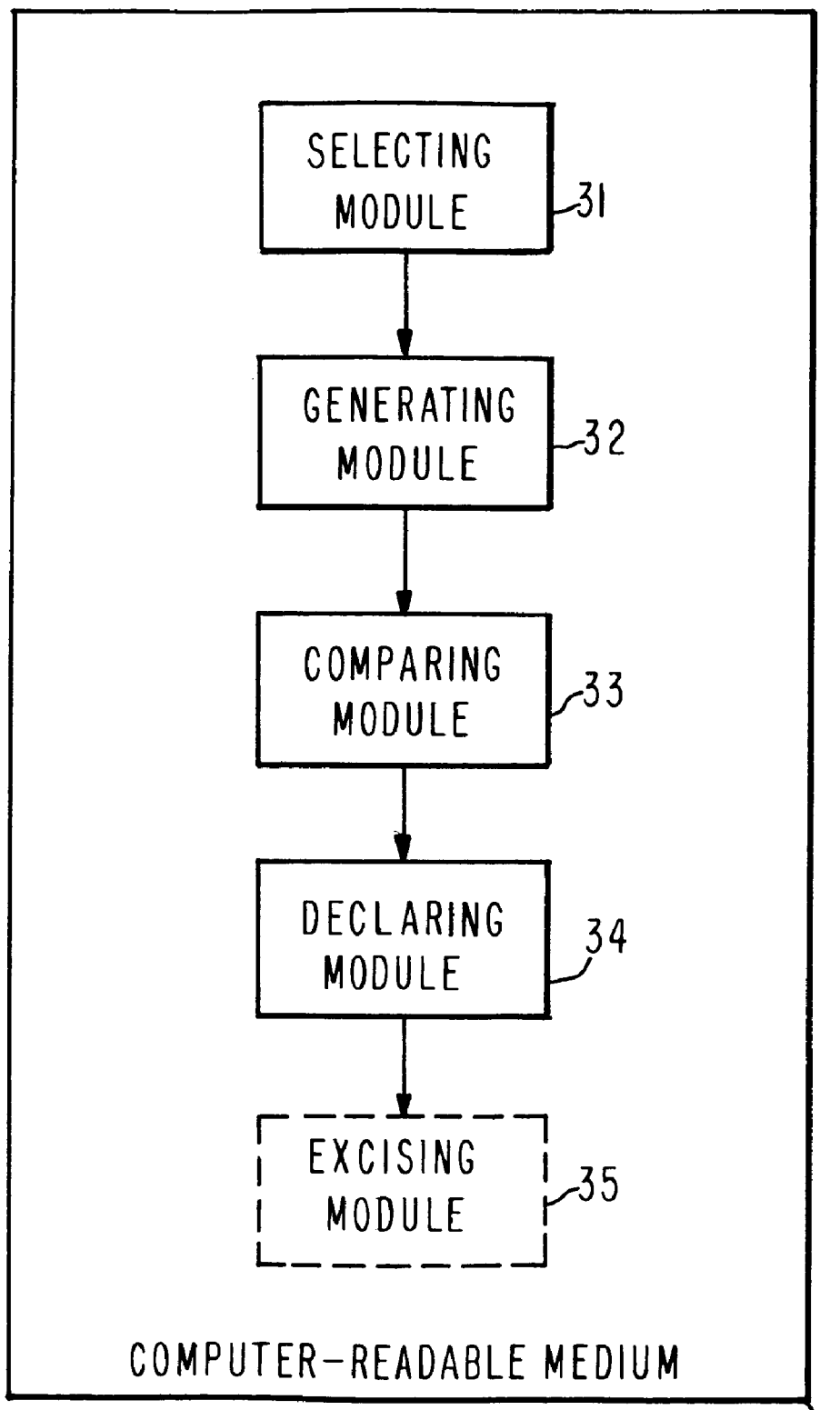
FIG. 3 is a block diagram illustrating software, firmware, and/or hardware modules 31-35 used in a preferred embodiment of the present invention.
Figure 4:
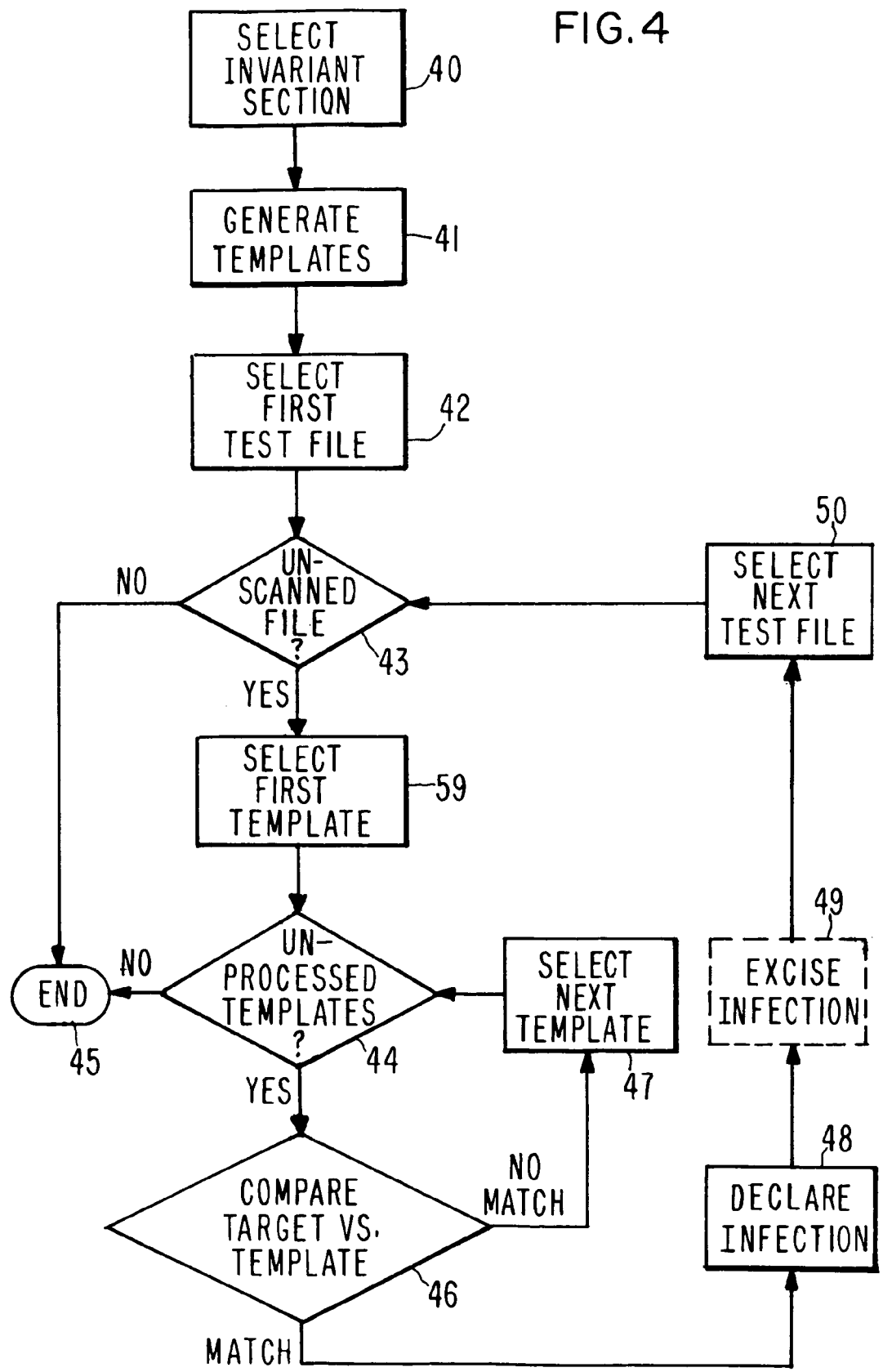
FIG. 4 is a flow diagram illustrating a preferred embodiment of the present invention.
Figure 5:
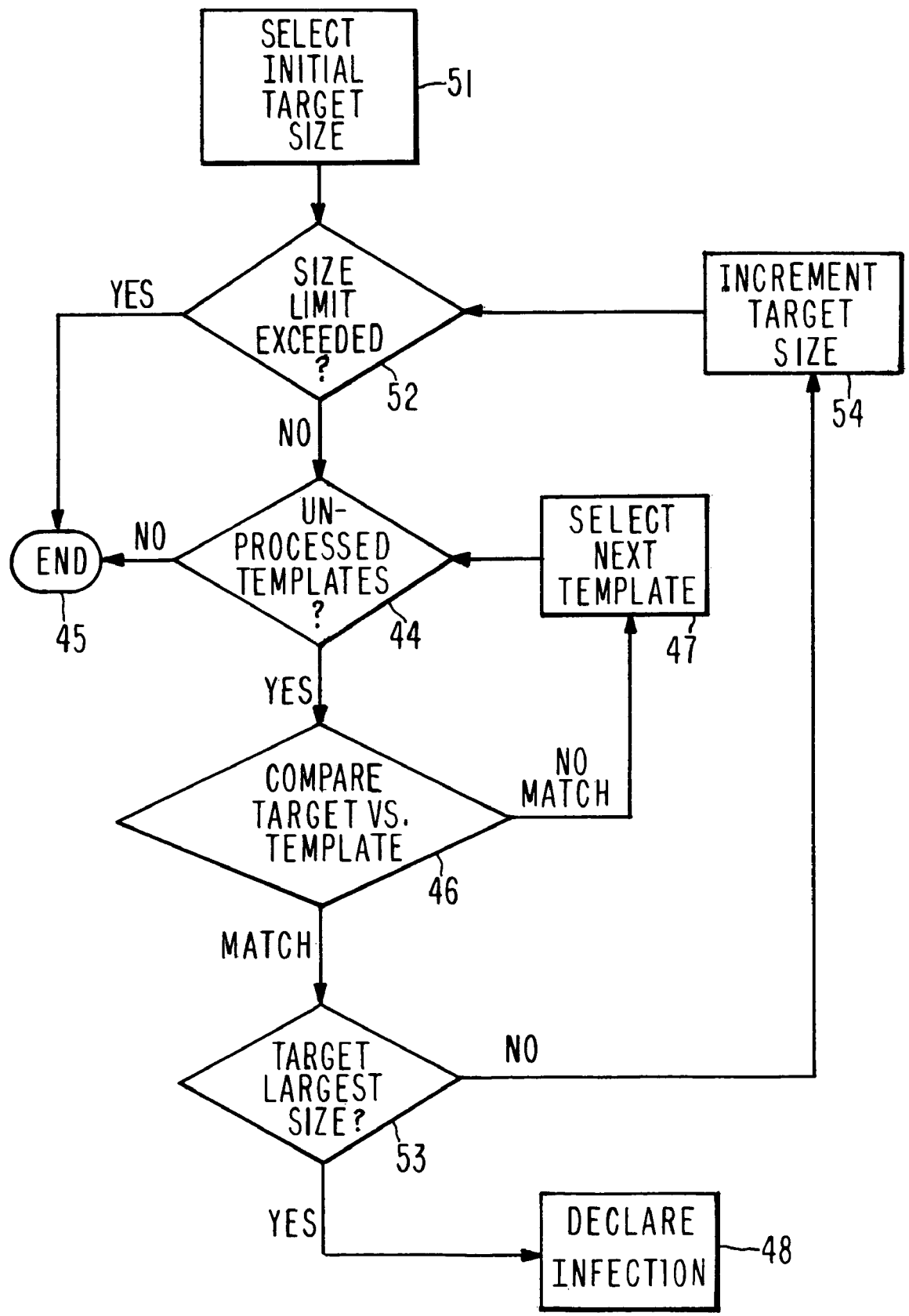
FIG. 5 is a flow diagram of a preferred embodiment of the present invention in which an iterative comparison is used.

The method steps illustrated in FIGS. 4 and 5 can be implemented by means of the modules 31-35 illustrated in FIG. 3. Modules 31-35 can be implemented in hardware, software, and/or firmware. These modules 31-35 may reside on a computer-readable medium 30 such as memory, a hard disk, floppy disk, CD, DVD, etc. Selecting module 31 is coupled to generating module 32, which is coupled to comparing module 33, which is coupled to declaring module 34, which is coupled to optional excising module 35.

Turning now to FIG. 4, the method begins at step 40, where selecting module 31 selects a section of each file 20 that is invariant to a) to malicious code infections to file 20; and b) subsequent repairs to said malicious code infections. As used throughout this patent application, "section of the file" is to be construed broadly, and encompasses an entire section of file 20 meeting these two criteria, one or more portions of one or more sections of file 20 meeting these two criteria, a hash of a section of file 20 meeting these two criteria, and/or hashes of one or more portions of one or more sections of file 20 meeting these two criteria. Furthermore, "section" can mean a single section, or one or more sections taken together.

The invariant section may be a data section 24,25, a resources section 28, a date and time stamp, a base load address, or any combination thereof. However, this is by no means an exhaustive list, and those skilled in the art will readily appreciate that many other invariant sections could be chosen.

The system designer may define the invariant section based upon the type of file 20. For example, one may wish to target the first data section 24 for a PE executable file 20, while targeting the resources section 28 plus the date and time stamp for another executable file format.

In the preferred embodiment, the invariant section is a data section 24, 25. This is because malicious code rarely infects or modifies a data section 24,25 of an executable file. In addition, antivirus repairs don't modify a data section 24,25 either, since viral infections avoid these areas. Thus, a data section 24,25 is both unique and untouched before and after infection. Virtually every executable file 20 has a data section 24,25 that contains executable data, e.g., string data, numeric data, etc. This data is unique to each program 20 and acts as a unique identifier of the program 20. Therefore, using a data area 24,25 as the invariant section by itself, or coupled with one or more other infection and repair invariant fields elsewhere in the executable file 20, uniquely identifies a program 20 (including malicious code, such as a worm or Trojan horse), before and after infection, and after repair as well. Furthermore, a data section 24,25 is easily locatable via information in the file header 21. Finally, a data section 24,25 is not dependent on variant sections of the header 21 information, such as entry point code. For the above reasons, the present invention makes it possible to identify even multiply-infected and repaired malicious code.

Preferably, a hash is taken of the invariant section, in order to save space and time. As used throughout this patent application, a "hash" or "hash function" is a one-way function, from a variable size input to a fixed size output, that is substantially collision free. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

The method then proceeds to step 41, where generating module 32 uses an algorithm to generate a template for each of a set of files containing known standalone malicious code infections (such as worm or Trojan horse executable files). The section of each malicious code file used for a template corresponds to the invariant section selected in step 40. Thus, if the invariant section is defined to be second data section 25, each template is also a second data section 25 of a file containing a known malicious code infection. Similarly, if the invariant section selected in step 40 is a hash of second data section 25, each template is a hash (using the same hash function applied to the invariant section) of a second data section 25 of a file containing a known malicious code infection. Examples of hashes of data sections of the known Win32 worms HAPPY00.EXE and SKA.EXE are given below:

HAPPY00.EXE
HASH=D16202DA4E6C4B59BA85A0A8D640405B
SKA.EXE:
HASH=D4577905A31C18C41BAE98549B8C6A95

Also at step 41 (or, alternatively, at steps 42 and 50), generating module 32 uses the same algorithm that it did in generating the templates to generate a target 29 within each file 20 that is to be tested for the presence or absence of malicious code. Since the algorithm is the same, it follows that each target 29 also corresponds to the invariant section selected in step 40.

An exemplary target 29 is superimposed upon FIG. 2 using dashed lines, and consists, solely for purposes of illustration, of the date and time stamp plus the first data section 24 of file 20.

At step 42, a module having overall supervisory responsibility (e.g., comparing module 33) selects the first test file 20 to be processed. If there are no such unprocessed test files 20, as determined by comparing module 33 at step 43, the method ends at step 45. If there is such a test file 20 to be processed, the method proceeds to step 59, where comparing module 33 selects the first template to be processed, i.e., the template from the first known malicious code program in the set. At step 44, comparing module 33 asks whether there are any templates yet to be processed. If the answer is no, the method ends at step 45. If the answer is yes, the method proceeds to step 46.

The method for searching through the templates illustrated in FIG. 4 is a linear search. However, as is well known in the art, many other techniques may be employed to speed the searching, e.g., a binary search tree, a hash table, etc.

At step 46, comparing module 33 compares the target 29 against the template currently being processed. If the two do not match exactly, the method goes to step 47, where the next template is selected for processing, and then back to step 44. If the target 29 and the template match exactly, the method proceeds to step 48, where declaring module 34 declares the presence of malicious code within test file 20. The comparison at step 46 can compare the entire target 29 with the entire template, a subset of the target 29 with a corresponding subset of the template, a hash of the target 29 with a corresponding hash of template, or a hash of a subset of the target 29 with a corresponding hash of a corresponding subset of the template.

The declaration at step 48 can be made with a high degree of confidence, even if there has been a secondary infection or a repair to file 20, because the examination of file 20 was based upon a section that was determined in advance to be invariant with respect to secondary infection and to possible subsequent repair. The declaration of infection can be in the form of a visual or audible alarm to the system administrator. The declaration can cause other events to occur, such as aborting the processing of computer 1.

At optional step 49, optional excising module 35 excises the malicious code from file 20. This may entail the complete deletion of file 20 from computer 1. Control then passes to step 50, where comparing module 33 selects the next test file 20 to be processed, then back to step 43.

If a test file 20 is compressed (e.g., zipped or packed), it should be first decompressed before being subjected to the processing of FIG. 4. The decompression can be performed in step 42 and/or step 50.

In order to speed processing, the invariant section can be defined in step 40 to be relatively small. This runs the risk, however, of false positives, because many short file sections can compare to the same value or hash to the same value, whether or not they are sections from malicious code. In order to speed processing without running the risk of increasing the number of false positives, the method of FIG. 5 can be employed, in which comparing step 46 is expanded into a sequence of iterative comparisons.

The method of FIG. 5 works on the basis of an initial relatively small portion of the target 29 being selected in step 51, with the size of the target 29 being incremented in an outer loop 52-54 surrounding an inner template comparison loop 44-47. If there are no matches made with a less than maximum target 29 size, there is no need to increment the target 29 size, because it is known there will never be a match, regardless of how large the target 29 becomes. Thus, processing time is saved.

At step 52, comparing module 33 asks whether the pre-selected upper bound (uniqueness level) placed on the target 29 size has been exceeded. If so, the method ends at step 45. This uniqueness level can correspond to the size of the target 29 that was established in step 42 of FIG. 4. If this size limit has not been exceeded, the method proceeds to step 44, which is identical to step 44 of FIG. 4. Steps 46 and 47 are also identical with their counterparts in FIG. 4.

Step 53, however, is new to FIG. 5, and is invoked when there is a match between the target 29 and a template. At step 53, comparing module 33 asks whether the target 29 is the largest size, i.e., the pre-selected uniqueness level. If the answer is yes, an infection is declared in step 48 (as in FIG. 4), because matching at every iteration has occurred. Thus, it is appropriate to declare the presence of a malicious code infection in test file 20. If, on the other hand, the target 29 has not been incremented to its largest size, a match at step 46 does not result in the declaration of an infection, but rather results in control being passed to step 54, where comparing module 33 increments the size of the target 29 upwards to the next pre-selected size. The increments can be uniform or non-uniform. Control then passes back to step 52.

The reason for not declaring the presence of a malicious code infection when the match is performed at a template 29 size less than the maximum is that such a match may be a false positive. This is because, for a less than maximum target 29 size, many things, including malicious code and non-malicious code, can map or hash to the same value. Therefore, we need to do another iteration on a larger portion of the target 29.

Note that the way this iterative sizing process works is that if there is no match at a given target 29 size, the method is aborted, indicating no malicious infection in test file 20. This saves processing time. A malicious code infection is declared (at step 48) only when there is a match at every target 29 size, including the largest.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for detecting a primary malicious code infection in a test file that is at risk of having also been infected by a secondary malicious code infection, the method comprising the steps of:
   selecting a section of a computer file that corresponds to the test file, wherein the selected section is invariant to the secondary malicious code infection and to repair thereof;
   using the selected section to generate a template corresponding to each of a set of primary malicious code infections, the template to be used to test for the presence of the primary malicious code infection;
   identifying a target section within the test file corresponding to the selected section;
   comparing the target section with each of the generated templates; and
   when the target section matches a generated template corresponding to a primary malicious code infection, declaring the presence of the primary malicious code infection in the test file.

2. The method of clam 1 wherein the comparing step comprises comparing a subset of the target section with a corresponding subset of each generated template.

3. The method of claim 1 wherein the comparing step comprises comparing a hash of the target section with a corresponding hash of each generated template.

4. The method of claim 1 wherein the comparing step comprises comparing a hash of a subset of the target section with a corresponding hash of a corresponding subset of each generated template.

5. The method of claim 1 wherein the selected section of the computer file that corresponds to the test file comprises a data section of the computer file.

6. The method of claim 1 wherein the selected section of the computer file that corresponds to the test file comprises a date and time stamp located within the computer file.

7. The method of claim 1 wherein the selected section of the computer file that corresponds to the test file comprises a base load address for the computer file.

8. The method of claim 1 wherein the selected section of the computer file that corresponds to the test file comprises a resources section of the computer file.

9. The method of claim 1 wherein the comparing step comprises an iterative sequence of compares, beginning with a comparison of a relatively small portion of the target section with a corresponding portion of each generated template, and ending with a comparison of a relatively large portion of the target section with a corresponding portion of each generated template.

10. The method of claim 9 wherein, for any compare, the test file is declared to be free of a primary malicious code infection when there is no match between the portion of the target being processed for that compare and the corresponding portion of a generated template corresponding to the primary malicious code infection.

11. The method of claim 9 wherein the presence of primary malicious code infection in the test file is declared only when the last compare produces a match between the portion of the target section being processed for that compare and the corresponding portion of a generated template corresponding to the primary malicious code infection.

12. The method of claim 1 further comprising the step of excising the primary malicious code infection from the test file.

13. The method of claim 1 wherein the test file is compressed, the method further comprising the step of decompressing the test file.

14. The method of claim 1 wherein the selected section is selected based upon the computer file's type.

15. An apparatus for testing for the presence of a primary malicious code infection in a plurality of test files that are at risk of having also been infected by a secondary malicious code infection, the apparatus comprising:
a selecting module adapted to select, for each test file, a section of a computer file that corresponds to the test file, wherein the selected section is invariant to the secondary malicious code infection and to repair thereof;
coupled to the selecting module, a generating module adapted to generate, using the selected section, for each of a set of known primary malicious code infections, a template to be used to test for the presence of the primary malicious code infection;
coupled to the generating module, a comparing module adapted to compare a target section, corresponding to the selected section, within a test file from among the plurality of computer files to each of the generated templates; and
coupled to the comparing module, a declaring module adapted to declare the presence of malicious code in the test file when the target matches a generated template corresponding to a primary malicious code infection.

16. The apparatus of claim 15 further comprising, coupled to the declaring module, an excising module adapted to excise the malicious code from the test file.

17. A computer-readable medium containing computer code for countering a primary malicious code infection in a plurality of test files that are at risk of having also been infected by a secondary malicious code infection, the computer code comprising instructions for performing a method, the method comprising the steps of:
selecting, for each test file, a section of a computer file that corresponds to the test file, wherein the selected section is invariant to the secondary malicious code infection and to repair thereof;
for each of a set of known primary malicious code infections, using the selected section to generate a template, the template for testing for the presence of the known primary malicious code infection;
identifying a target section, corresponding to the selected section, within a test file from among the plurality of test files;
comparing the target section with each of the generated templates; and
declaring the presence of a primary malicious code infection in the test file when the target section matches a generated template corresponding to the primary malicious code infection.

18. The computer-readable medium of claim 17 wherein the computer code further comprises instructions for performing the step of excising the primary malicious code from the test file.

19. The computer-readable medium of claim 17 wherein the comparing step comprises comparing a subset of the target section with a corresponding subset of each generated template.

20. The computer-readable medium of claim 17 wherein the comparing step comprises comparing a hash of the target section with a corresponding hash of each generated template.

21. The computer-readable medium of claim 17 wherein the comparing step comprises comparing a hash of a subset of the target section with a corresponding hash of a corresponding subset of each generated template.

22. The computer-readable medium of claim 17 wherein the selected section of each computer file comprises a data section of the file.

23. The computer-readable medium of claim 17 wherein the comparing step comprises an iterative sequence of compares, beginning with a comparison of a relatively small portion of the target section with a corresponding portion of each generated template, and ending with a comparison of a relatively large portion of the target section with a corresponding portion of each generated template.

24. The computer-readable medium of claim 23 wherein, for any compare, the test file is declared to be free of a primary malicious code infection when there is no match between the portion of the target being processed for that compare and the corresponding portion of a generated template corresponding to the primary malicious code infection.

25. The computer-readable medium of claim 23 wherein the presence of malicious code in the test file is declared only when the last compare produces a match between the portion of the target section being processed for that compare and the corresponding portion of a generated template.

* * * * *

UNITED STATES PATENT AND TRADEMARK OFFICE
CERTIFICATE OF CORRECTION

PATENT NO.        : 7,367,056 B1
APPLICATION NO.   : 10/162732
DATED             : April 29, 2008
INVENTOR(S)       : Peter Szor et al.

It is certified that error appears in the above-identified patent and that said Letters Patent is hereby corrected as shown below:

At claim 2, column 6, line 35, please change "clam" to --claim--.

Signed and Sealed this

Twenty-ninth Day of July, 2008

JON W. DUDAS
*Director of the United States Patent and Trademark Office*